United States Patent
Zhang et al.

(10) Patent No.: US 11,430,167 B2
(45) Date of Patent: Aug. 30, 2022

(54) IMAGE PROCESSING METHOD AND APPARATUS, COMPUTER DEVICE, AND STORAGE MEDIUM

(71) Applicant: SHENZHEN SENSETIME TECHNOLOGY CO., LTD., Guangdong (CN)

(72) Inventors: Ruimao Zhang, Guangdong (CN); Ping Luo, Guangdong (CN)

(73) Assignee: SHENZHEN SENSETIME TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/535,202

(22) Filed: Nov. 24, 2021

(65) Prior Publication Data

US 2022/0084270 A1    Mar. 17, 2022

Related U.S. Application Data

(63) Continuation of application No. PCT/CN2021/076276, filed on Feb. 9, 2021.

(30) Foreign Application Priority Data

Feb. 24, 2020 (CN) .......................... 202010112615.9

(51) Int. Cl.
*G06T 11/60* (2006.01)
*G06V 10/25* (2022.01)
(Continued)

(52) U.S. Cl.
CPC ............ *G06T 11/60* (2013.01); *G06N 3/0454* (2013.01); *G06N 3/08* (2013.01); *G06T 3/4007* (2013.01);
(Continued)

(58) Field of Classification Search
CPC ......... G06T 11/60; G06T 3/4007; G06T 5/50; G06V 10/25; G06N 3/0454; G06N 3/08
See application file for complete search history.

(56) References Cited

U.S. PATENT DOCUMENTS

| 8,976,230 B1* | 3/2015 | Vendrow ................. G06T 11/60 348/46 |
| 10,008,039 B1* | 6/2018 | Neustein ............... G06T 11/001 |

(Continued)

FOREIGN PATENT DOCUMENTS

| CN | 103597519 | 2/2014 |
| CN | 104933757 | 9/2015 |

(Continued)

OTHER PUBLICATIONS

PCT International Search Report in International Appln. No. PCT/CN2021/076276, dated Apr. 27, 2021, 4 pages (With English Translation).

(Continued)

*Primary Examiner* — Kevin Ky
(74) *Attorney, Agent, or Firm* — Fish & Richardson P.C.

(57) ABSTRACT

Methods, systems, apparatus, and non-transitory computer readable storage media for image processing are provided. In one aspect, an image processing method includes: generating a garment deformation template image and a first human body template image based on a first semantic segmentation image of a human body in a first image and a target garment image, generating a target garment deformation image by performing deformation on the target garment image based on the garment deformation template image, obtaining a second human body template image by adjusting the first human body template image based on a second semantic segmentation image of the human body in the first image and the garment deformation template image, and transforming the first image into a second image including (Continued)

the human body wearing a target garment based on the target garment deformation image, the second human body template image, and the garment deformation template image.

20 Claims, 5 Drawing Sheets

(51) Int. Cl.
    *G06N 3/04*     (2006.01)
    *G06N 3/08*     (2006.01)
    *G06T 3/40*     (2006.01)
    *G06T 5/50*     (2006.01)

(52) U.S. Cl.
    CPC ............... *G06T 5/50* (2013.01); *G06V 10/25* (2022.01); *G06T 2207/20221* (2013.01); *G06T 2207/30196* (2013.01)

(56) References Cited

U.S. PATENT DOCUMENTS

| | | | |
|---|---|---|---|
| 2013/0336523 A1* | 12/2013 | Ruan | G06F 3/04845 345/620 |
| 2014/0240222 A1 | 8/2014 | Sugita et al. | |
| 2016/0284132 A1 | 9/2016 | Kim et al. | |
| 2017/0053456 A1 | 2/2017 | Cho et al. | |
| 2018/0047192 A1* | 2/2018 | Kristal | G06Q 30/0643 |
| 2019/0043269 A1* | 2/2019 | Lin | G06T 7/62 |
| 2019/0287301 A1 | 9/2019 | Colbert | |
| 2020/0027244 A1* | 1/2020 | Ueda | G06V 10/25 |
| 2021/0090209 A1* | 3/2021 | Appleboim | G06T 5/006 |
| 2021/0133919 A1* | 5/2021 | Ayush | G06T 11/60 |
| 2022/0067999 A1* | 3/2022 | Iwasaki | G06T 11/60 |
| 2022/0084270 A1* | 3/2022 | Zhang | G06T 5/50 |

FOREIGN PATENT DOCUMENTS

| | | |
|---|---|---|
| CN | 107977885 | 5/2018 |
| CN | 110211196 | 9/2019 |
| CN | 111339918 | 6/2020 |
| KR | 102044348 | 1/2019 |
| TW | 201516923 | 5/2015 |
| TW | 201814485 | 4/2018 |
| WO | 2019207296 | 10/2019 |

OTHER PUBLICATIONS

PCT Written Opinion in International Appln. No. PCT/CN2021/076276, dated Apr. 27, 2021, 7 pages (With English Translation).

TW Office Action issued in Taiwan Appln. No. 110106219, dated Aug. 27, 2021, 15 pages (With English Translation).

Yang et al., "Towards Photo-Realistic Virtual Try-On by Adaptively Generating↔Preserving Image Content" arXiv:2003.05863v1, Mar. 12, 2020, 13 pages.

KR Office Action issued in Korean Appln. No. 10-2021-7039222, dated May 27, 2022, 20 pages (With English Translation).

Extended European Search Report issued in European Appln. No. 21760267.1, dated Jul. 18, 2022, 14 pages.

Lee et al., "La-Viton: A Network for Looking-Attractive Virtual Try-On" 2019 IEEE/CVF International Conference On Computer Vision Workshop (ICCVW), Oct. 27, 2019, 4 pages.

Pandey et al., "Poly-GAN: Multi-Conditioned GAN for Fashion Synthesis"arxiv.org, Cornell University Library, Sep. 5, 2019, 10 pages.

Sun et al., "Image-Based Virtual Try-on Network with Structural Coherence" 2019 IEEE International Conference On Image Processing (ICIP), Sep. 22, 2019, 5 pages.

\* cited by examiner

IMAGE PROCESSING METHOD AND APPARATUS, COMPUTER DEVICE, AND STORAGE MEDIUM

CROSS REFERENCE TO RELATED APPLICATIONS

This application is a continuation of International Application No. PCT/CN2021/076276, filed on Feb. 9, 2021, which claims priority to Chinese Patent Application No. CN202010112615.9 entitled "IMAGE PROCESSING METHOD, IMAGE PROCESSING APPARATUS, COMPUTER DEVICE AND STORAGE MEDIUM" filed on Feb. 24, 2020, the entire contents of which are incorporated herein by reference.

TECHNICAL FIELD

The present disclosure relates to the field of image processing technologies, and in particular to an image processing method, an image processing apparatus, a computer device and a storage medium.

BACKGROUND

Virtual try-on technology can perform image fusion on a human body pose image and a garment image, such that a garment worn by a human body presents the same effect as a garment in the garment image in a case of a human body pose unchanged.

A virtual try-on image obtained with a current image processing method involved in the virtual try-on usually has a large number of artificial traces and blurred edges, leading to poor fidelity.

SUMMARY

Embodiments of the present disclosure provide at least one image processing solution.

According to a first aspect of embodiments of the present disclosure, provided is an image processing method. The method includes: generating a garment deformation template image and a first human body template image based on a first semantic segmentation image of a human body in a first image and a target garment image, where in the first human body template image, a human body region not covered by a target garment is marked; generating a target garment deformation image by performing deformation on the target garment image based on the garment deformation template image; obtaining a second human body template image by adjusting the first human body template image based on a second semantic segmentation image of the human body in the first image and the garment deformation template image; transforming the first image into a second image comprising the human body wearing the target garment based on the target garment deformation image, the second human body template image, and the garment deformation template image.

In this case, various template images are obtained by use of the semantic segmentation images (for example, the first semantic segmentation image and the second semantic segmentation image) of the first image and the target garment image, and the second image including the human body wearing the target garment is finally obtained by adjusting the first image and the target garment image based on various template images and the semantic segmentation images. In the above process, detail information of the human body is fully extracted by use of the semantic segmentation technology. In this way, detail loss in a try-on process can be reduced, and a fidelity of an image after try-on is further improved.

In one optional implementation, the image processing method further includes: generating a human body keypoint image representing human body pose keypoints by performing keypoint identification on the first image; generating the garment deformation template image and the first human body template image based on the first semantic segmentation image of the first image and the target garment image includes: generating the garment deformation template image and the first human body template image based on the first semantic segmentation image, the human body keypoint image and the target garment image.

In this case, through detection of human body pose information, the generated garment deformation template image and first human body template image are enabled to have higher precision, and thus a deformed garment image obtained by deforming the target garment is made more fit to a human body pose and more precise. Furthermore, in the second human body template image generated based on the first human body template image, a human body region not covered by the target garment is more precisely marked, such that the finally-generated second image has higher fidelity.

In one optional implementation, generating the garment deformation template image and the first human body template image based on the first semantic segmentation image, the human body keypoint image and the target garment image includes: obtaining the first human body template image and the garment deformation template image by processing the first semantic segmentation image, the human body keypoint image and the target garment image with a semantic generative network.

In one optional implementation, the semantic generative network includes a first generative adversarial network and a second generative adversarial network. Obtaining the first human body template image and the garment deformation template image by processing the first semantic segmentation image, the human body keypoint image and the target garment image with the semantic generative network includes: obtaining the first human body template image by processing the first semantic segmentation image, the human body keypoint image and the target garment image with the first generative adversarial network; obtaining the garment deformation template image by processing the first human body template image, the human body keypoint image and the target garment image with the second generative adversarial network.

In this case, the first human body template image and the garment deformation template image are obtained by using the first generative adversarial network and the second generative adversarial network respectively. In this way, the learning of the generative adversarial networks for human body details is fully utilized such that the generated first human body template image and the generated garment deformation template image have higher precision.

In one optional implementation, the first semantic segmentation image is generated in the following manner including: generating a raw semantic segmentation image by performing semantic segmentation on the first image; where the raw semantic segmentation image includes semantic segmentation regions respectively corresponding to different parts of the human body in the first image; generating the first semantic segmentation image by fusing at least two of the semantic segmentation regions belonging to a same limb and having different semantic segmentation results in the raw semantic segmentation image.

In one optional implementation, generating the target garment deformation image by performing deformation on the target garment image based on the garment deformation template image includes: obtaining the target garment deformation image by performing deformation on the target garment image with a garment deformation network based on the garment deformation template image.

In one optional implementation, the garment deformation network is trained in the following manner including: obtaining a sample garment deformation template image and a sample garment image; learning deformation relationship information between the sample garment image and the sample garment deformation template image with a neural network, and obtaining a predicted deformation image of the sample garment image by performing thin plate spline interpolation transformation on the sample garment image based on the deformation relationship information; obtaining a model loss based on a second-order differential constraint of the thin plate spline interpolation transformation, the predicted deformation image and the sample garment image, and training the neural network based on the model loss; taking the trained neural network as the garment deformation network.

In this case, when deformation is performed for the target garment image based on the garment deformation template image, the garment deformation network used herein may introduce two properties of affine transformation, i.e. collinearity and same proportion of corresponding line segments, to the deformation process of a sample garment through the second-order differential constraint in a training, thus reducing occurrence of excessive twist deformation during deformation of the sample garment, obtaining a better garment feature preservation result and improving the fidelity of the deformed garment.

In one optional implementation, different parts of the human body in the first image are marked in the first semantic segmentation image; the second semantic segmentation image includes: a first semantic segmentation sub-image in which a human body part covered by an original garment in the first image is marked; and a second semantic segmentation sub-image in which a human body part not covered by the original garment in the first image is marked.

In one optional implementation, obtaining the second human body template image by adjusting the first human body template image based on the second semantic segmentation image of the human body in the first image and the garment deformation template image includes: obtaining a first intermediate template image by performing element-by-element multiplication on the first semantic segmentation sub-image and the first human body template image; where the first intermediate template image includes a first sub-template image in which a human body region covered by the original garment but not covered by the target garment is marked, and/or, a second sub-template image in which a human body region covered by the target garment but not covered by the original garment is marked; generating a second intermediate template image by performing element-by-element addition on the first intermediate template image and the second semantic segmentation sub-image; obtaining the second human body template image by performing element-by-element multiplication on the second intermediate template image and a complementary set of the garment deformation template image.

In this case, a part of a non-target limb is preserved precisely in combination with the first semantic segmentation sub-image and the second semantic segmentation sub-image, such that details of the part of the non-target limb can be fully restored in the entire process of the image processing so as to fully preserve corresponding details in the first image. Further, under the guidance of the generated first intermediate template image, a body part region which is coherent with the human body part covered by the target garment and is covered by the original garment in the first image can be identified. This way, it is ensured that loss of a body part in the generated second image due to a particular body part which is covered by the original garment but not covered by the target garment will not occur. Thus, the precision of the generated second image is further improved.

In one optional implementation, transforming the first image into the second image comprising the human body wearing the target garment based on the target garment deformation image, the second human body template image, and the garment deformation template image includes: generating a refined image of the target garment deformation image by performing refining by inputting the target garment deformation image into a refining network; generating a refined target garment deformation image based on the refined image and the target garment deformation image; transforming the first image into the second image based on the refined target garment deformation image, the second human body template image and the garment deformation template image.

In one optional implementation, transforming the first image into the second image based on the refined target garment deformation image, the second human body template image and the garment deformation template image includes: generating a human body image in which regions covered by the target garment and the original garment are removed, based on the first image, the second semantic segmentation image of the first image, and the garment deformation template image; obtaining the second image by fusing the refined target garment deformation image, the second human body template image, the garment deformation template image and the human body image.

In one optional implementation, obtaining the second image by fusing the refined target garment deformation image, the second human body template image, the garment deformation template image and the human body image includes: obtaining the second image by concatenating and inputting the refined target garment deformation image, the second human body template image, the garment deformation template image and the human body image into a pre-trained fusion network.

In one optional implementation, the fusion network is trained in the following manner including: obtaining a sample garment deformation image, a sample human body template image, a sample garment deformation template image, and a sample human body image in which regions covered by a sample garment and an original garment are removed; generating a covered sample human body image by performing random covering for a limb associated with a human body region covered by the original garment in the sample human body image; obtaining a predicted image by inputting the sample garment deformation image, the sample human body template image, the sample garment deformation template image, and the covered sample human body image into a third generative adversarial network; training the third generative adversarial network based on the predicted image and a real image corresponding to the predicted image; taking the trained third generative adversarial network as the fusion network.

In this case, the fusion network is used to perform fusion for the refined target garment deformation image, the second human body template image, the garment deformation template image and the human body image; during training, the fusion network may perform random covering for a limb associated with a human body region covered by the original garment in the sample human body image so as to utilize the principle of image inpainting, such that the fusion network can supplement the lost body part in the re-dressed image. The second image obtained hereby has higher fidelity.

According to a second aspect of embodiments of the present disclosure, provided is an image processing apparatus. The image processing apparatus includes: a generating module, configured to generate a garment deformation template image and a first human body template image based on a first semantic segmentation image of a human body in a first image and a target garment image, where, in the first human body template image, a human body region not covered by a target garment is marked; a deforming module, configured to generate a target garment deformation image by performing deformation on the target garment image based on the garment deformation template image; a limb combining module, configured to obtain a second human body template image by adjusting the first human body template image based on a second semantic segmentation image of the human body in the first image and the garment deformation template image; a fusing module, configured to transforming the first image into a second image including the human body wearing the target garment based on the target garment deformation image, the second human body template image, and the garment deformation template image.

In one possible implementation, the image processing apparatus further includes: a first processing module, configured to generate a human body keypoint image representing human body pose keypoints by performing keypoint identification on the first image. When generating the garment deformation template image and the first human body template image based on the first semantic segmentation image of the first image and the target garment image, the generating module is specifically configured to: generate the garment deformation template image and the first human body template image based on the first semantic segmentation image, the human body keypoint image and the target garment image.

In one possible implementation, when generating the garment deformation template image and the first human body template image based on the first semantic segmentation image, the human body keypoint image and the target garment image, the generating module is specifically configured to: obtain the first human body template image and the garment deformation template image by processing the first semantic segmentation image, the human body keypoint image and the target garment image with a semantic generative network.

In one possible implementation, the semantic generative network includes a first generative adversarial network and a second generative adversarial network. When obtaining the first human body template image and the garment deformation template image by processing the first semantic segmentation image, the human body keypoint image and the target garment image with the semantic generative network, the generating module is specifically configured to: obtain the first human body template image by processing the first semantic segmentation image, the human body keypoint image and the target garment image with the first generative adversarial network; obtain the garment deformation template image by processing the first human body template image, the human body keypoint image and the target garment image with the second generative adversarial network.

In one possible implementation, the image processing apparatus further includes: a second processing module, configured to generate the first semantic segmentation image in the following manner including: generating a raw semantic segmentation image by performing semantic segmentation on the first image; where the raw semantic segmentation image includes semantic segmentation regions respectively corresponding to different parts of the human body in the first image; generating the first semantic segmentation image by fusing at least two of the semantic segmentation regions belonging to a same limb and having different semantic segmentation results in the raw semantic segmentation image.

In one possible implementation, when generating the target garment deformation image by performing deformation on the target garment image based on the garment deformation template image, the deforming module is configured to: obtain the target garment deformation image by performing deformation on the target garment image with a garment deformation network based on the garment deformation template image.

In one possible implementation, the image processing apparatus further includes: a first model training module 87, configured to train the garment deformation network in the following manner including: obtaining a sample garment deformation template image and a sample garment image; learning deformation relationship information between the sample garment image and the sample garment deformation template image with a neural network, and obtaining a predicted deformation image of the sample garment image by performing thin plate spline interpolation transformation on the sample garment image based on the deformation relationship information; obtaining a model loss based on a second-order differential constraint of the thin plate spline interpolation transformation, the predicted deformation image and the sample garment image, and training the neural network based on the model loss; taking the trained neural network as the garment deformation network.

In one possible implementation, different parts of the human body in the first image are marked in the first semantic segmentation image; the second semantic segmentation image includes: a first semantic segmentation sub-image in which a human body part covered by an original garment in the first image is marked; and a second semantic segmentation sub-image in which a human body part not covered by the original garment in the first image is marked.

In one possible implementation, when obtaining the second human body template image by adjusting the first human body template image based on the second semantic segmentation image of the human body in the first image and the garment deformation template image, the limb combining module is configured to: obtain a first intermediate template image by performing element-by-element multiplication on the first semantic segmentation sub-image and the first human body template image; where the first intermediate template image includes a first sub-template image in which a human body region covered by the original garment but not covered by the target garment is marked, and/or, a second sub-template image in which a human body region covered by the target garment but not covered by the original garment is marked; generate a second intermediate template image by performing element-by-element addition on the first intermediate template image and the second semantic segmentation sub-image; obtain the second human body template image by performing element-by-element multiplication on the second intermediate template image and a complementary set of the garment deformation template image.

In one possible implementation, when transforming the first image into the second image including the human body wearing the target garment based on the target garment deformation image, the second human body template image, and the garment deformation template image, the fusing module is configured to: generate a refined image of the target garment deformation image by performing refining by inputting the target garment deformation image into a refining network; generate a refined target garment deformation image based on the refined image and the target garment deformation image; transforming the first image into the second image based on the refined target garment deformation image, the second human body template image and the garment deformation template image.

In one possible implementation, when transforming the first image into the second image based on the refined target garment deformation image, the second human body template image and the garment deformation template image, the fusing module is configured to: generate a human body image in which regions covered by the target garment and the original garment are removed, based on the first image, the second semantic segmentation image of the first image, and the garment deformation template image; obtain the second image by fusing the refined target garment deformation image, the second human body template image, the garment deformation template image and the human body image.

In one possible implementation, when obtaining the second image by fusing the refined target garment deformation image, the second human body template image, the garment deformation template image and the human body image, the fusing module is configured to: obtain the second image by concatenating and inputting the refined target garment deformation image, the second human body template image, the garment deformation template image and the human body image into a pre-trained fusion network.

In one possible implementation, the image processing apparatus further includes a second model training module 88, configured to train the fusion network in the following manner including: obtaining a sample garment deformation image, a sample human body template image, a sample garment deformation template image, and a sample human body image in which regions covered by a sample garment and an original garment are removed; generating a covered sample human body image by performing random covering for a limb associated with a human body region covered by the original garment in the sample human body image; obtaining a predicted image by inputting the sample garment deformation image, the sample human body template image, the sample garment deformation template image, and the covered sample human body image into a third generative adversarial network; training the third generative adversarial network based on the predicted image and a real image corresponding to the predicted image; taking the trained third generative adversarial network as the fusion network.

According to a third aspect of embodiments of the present disclosure, provided is a computer device. The computer device includes a processor, a memory and a bus. The memory stores machine readable instructions executable by the processor. When the processor executes the machine readable instructions, the machine readable instructions cause the processor to implement the steps of the above first aspect or any possible implementation of the above first aspect.

According to a fourth aspect of embodiments of the present disclosure, provided is a computer readable storage medium. The computer readable storage medium stores computer programs. The computer programs are executed by a processor to implement the steps of the above first aspect or any possible implementation of the above first aspect.

In order to make the above objects, advantages and features of the present disclosure clearer and more understandable, the present disclosure will be further described below in combination with specific embodiments and accompanying drawings.

BRIEF DESCRIPTION OF THE DRAWINGS

In order to make the technical solutions of the embodiments of the present disclosure clearer, the accompanying drawing involved in the descriptions of the embodiments will be briefly introduced below. It should be understood that the following drawings only show some embodiments of the present disclosure and thus shall not be taken as limitation to the scope of protection of the present disclosure. Those skilled in the art may obtain other relevant drawings based on these drawings without paying creative work.

DETAILED DESCRIPTION OF THE EMBODIMENTS

Figure 1:
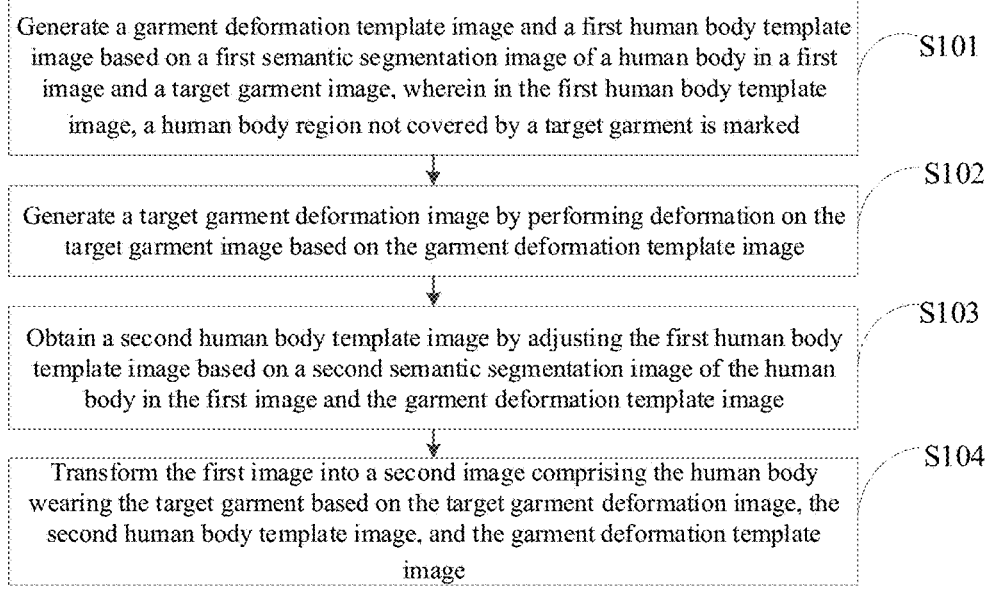
FIG. 1 is a flowchart illustrating an image processing method according to one or more embodiments of the present disclosure.

In order to make the objects, technical solutions and advantages of the embodiments of the present disclosure clearer, the technical solutions of the embodiments of the present disclosure will be fully and clearly described below in combination with the accompanying drawings in the embodiments of the present disclosure. Apparently, the embodiments described herein are merely some embodiments of the present disclosure rather than all embodiments. Those components of the embodiments of the present disclosure shown in the accompanying drawings are usually arranged and designed in different configurations. Therefore, detailed descriptions of the embodiments of the present disclosure provided in the accompanying drawings below are not intended to limit the scope of protection claimed by the present disclosure but only represent some selected embodiments of the present disclosure. Other embodiments obtained by those skilled in the art based on these embodiments without paying creative work shall all fall within the scope of protection of the present disclosure.

Researches show that there are usually two image processing manners for virtual try-on. In a first manner, gaming between a generator and a discriminator is performed using a generative adversarial network, and a neural network is enabled to learn to replace a garment on a human body through learning by analogy. This manner focuses on a semantic matching degree between a human body image for virtual try-on and a target garment. Because only the semantic matching degree therebetween is considered, a poor deformation effect of the garment is generated. Thus, only garment color and rough texture for try-on can be preserved, leading to a poor real effect of the generated re-dressed image. In a second manner, a garment is deformed using an intermediate representation of a human body and a thin plate spline interpolation algorithm, such that textures and patterns of the garment are mapped to the generated image. In this way, the neural network will have a capability to generalize to any garment. This manner focuses on considering preservation of garment features and performing deformation on the garment using thin plate spline interpolation. When a person pose in a reference picture is complex, the second manner often generates a large number of artificial traces and blurred edges. Although the garment deformation is relatively real, the generated re-dressed image still has a poor entire fidelity due to presence of artificial traces and blurred edges.

The present disclosure provides an image processing method and an image processing apparatus. Various template images are obtained by use of semantic segmentation images (for example, a first semantic segmentation image and a second semantic segmentation image) of a first image and a target garment image, and a second image including the human body wearing a target garment is finally obtained by adjusting the first image and the target garment image based on various template images and the semantic segmentation images. In the above process, detail information of the human body is fully extracted by use of the semantic segmentation technology. In this way, detail loss in a try-on process can be reduced, and a fidelity of an image after try-on is further improved.

The technical solutions of the embodiments of the present disclosure will be fully and clearly described below in combination with the accompanying drawings in the embodiments of the present disclosure. The embodiments described herein are merely some embodiments of the present disclosure rather than all embodiments. Those components of the embodiments of the present disclosure shown in the accompanying drawings are usually arranged and designed in different configurations. Therefore, detailed descriptions of the embodiments of the present disclosure provided in the accompanying drawings below are not intended to limit the scope of protection claimed by the present disclosure but only represent some selected embodiments of the present disclosure. Other embodiments obtained by those skilled in the art based on these embodiments without paying creative work shall all fall within the scope of protection of the present disclosure.

It should be noted that similar numerals and letters refer to similar items in the following drawings. Therefore, once one item is defined in one drawing, it is not required to make further definition and interpretation to the item in the subsequent drawings.

In order to help the understanding of the present disclosure, an execution subject of the image processing method of the embodiments of the present disclosure will be firstly introduced. The execution subject of the image processing method of the embodiments of the present disclosure may be a computer device having a computing power. The computer device may include, for example, a terminal device, or a server, or another processing device. The terminal device may be user equipment (UE), mobile device, user terminal, cellular phone, cordless phone, personal digital assistant (PDA), palm-held device, computing device, vehicle-mounted device, and wearable device and the like. The computer device may further include a local or remote server or the like. In some possible implementations, the image processing method may be implemented by invoking computer readable instructions stored in a memory through a processor.

FIG. 1 is a flowchart illustrating an image processing method according to one or more embodiments of the present disclosure. The method includes steps S101-S104.

At step S101, a garment deformation template image $M_c^S$ and a first human body template image $M_\omega^S$ are generated based on a first semantic segmentation image $M^F$ of a human body in a first image I and a target garment image $T_c$, where in the first human body template image $M_\omega^S$, a human body region not covered by a target garment is marked.

At step S102, a target garment deformation image $T_c^W$ is generated by performing deformation on the target garment image $T_c$ based on the garment deformation template image $M_c^S$.

At step S103, a second human body template image $M_\omega^C$ is obtained by adjusting the first human body template image $M_\omega^S$ based on a second semantic segmentation image of the human body in the first image and the garment deformation template image $M_c^S$.

At step S104, the first image is transformed into a second image $I^S$ including the human body wearing the target garment based on the target garment deformation image $T_c^W$, the second human body template image $M_\omega^C$, and the garment deformation template image $M_c^S$.

Detailed descriptions will be made below to the above steps S101-S104 respectively.

In the above step S101, the first image I may be, for example, an image including a human body. The image may be, for example, an image of a garment model, a selfie image of a user, an image taken by a user for others, or an image of a virtual garment model or the like. The first image I includes at least all or part of a human body and the human body included in the first image I includes at least a partial human body region covered by a target garment.

Figure 2:
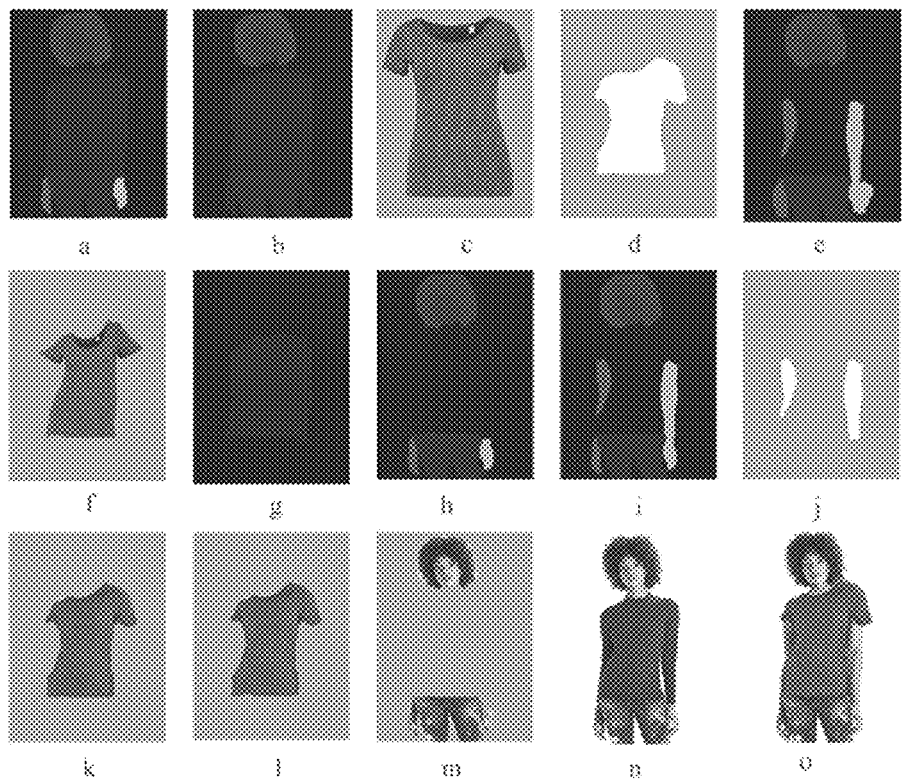
FIG. 2 is an example of each image involved in an image processing method according to one or more embodiments of the present disclosure.

For example, an image denoted as n in FIG. 2 provides a specific example of the first image.

For example, if the target garment is an upper outer garment, the first image I includes at least a partial upper body region of the human body. If the target garment is a half-length skirt, the first image I includes at least a partial lower body region under the waist of the human body. If the target garment is a one-piece dress, the first image I includes at least the partial upper body region and the partial lower body region of the human body.

The first semantic segmentation image $M^F$ of the human body in the first image I may be, for example, obtained by performing semantic segmentation on the first image I, where in the first semantic segmentation image $M^F$, a semantic segmentation result of each part of the human body in the first image I is marked.

Specifically, for example, a semantic segmentation result of each pixel point in the first image I may be obtained by inputting the first image I into a pre-trained human body semantic segmentation model, and then the first semantic segmentation image $M^F$ is obtained based on the semantic segmentation result of each pixel point in the first image I.

In a specific implementation, the human body semantic segmentation model can identify regions corresponding to different parts (for example, parts of the human body which are not covered by garment, such as face, hair, neck, upper body, lower body, arm (with hand) and leg) of the human body in the first image I, and can also identify the garments covering the different parts of the human body, such as an upper outer garment, trousers, skirt, cap and glove and the like. The semantic segmentation results of the first image can form one semantic segmentation image. In the semantic segmentation image, a pixel value of any pixel point is a semantic segmentation result (i.e. a classification value) of a pixel point of a corresponding position in the first image. For example, a classification result of a particular pixel point is a human face, its classification value is labeled as 1; if a classification result of a particular pixel point is a human hair, its classification value is labeled as 2; if a classification result of a particular pixel point is upper body, its classification value is labeled as 3, and so on. Finally, a semantic segmentation image M formed by the classification values of various pixel points of the first image I can be obtained. The image denoted as a in FIG. 2 provides a specific example of the semantic segmentation image M formed by performing semantic segmentation on the first image.

In one case, the semantic segmentation image M may be directly taken as the first semantic segmentation image $M^F$.

In some other cases, it is possible to identify regions belonging to a same limb in the human body of the first image as two different classifications when semantic segmentation is performed on the first image I. For example, an arm covered by an original garment and an arm not covered by the original garment are identified as different classifications. Actually, the target garments of these regions classified to different classifications are usually associated with each other. Therefore, after a raw semantic segmentation image is generated by performing semantic segmentation on the first image, the first semantic segmentation image $M^F$ may be generated by fusing at least two of the semantic segmentation regions belonging to a same limb and having different semantic segmentation results in the raw semantic segmentation image. The image denoted as b in FIG. 2 provides a specific sample of the first semantic segmentation image $M^F$ formed by fusing at least two of the semantic segmentation regions belonging to a same limb and having different semantic segmentation results in the semantic segmentation image M.

For example, in the image denoted as b in FIG. 2, the original garment of the human body in the first image I is an upper outer garment with sleeves covering to above the wrists; since the hands themselves belong to the same limb as the arms, a region identified as hands and a region identified as a body part covered by the original garment are fused.

For another example, the original garment of the human body in the first image I is trousers with trousers legs covering to knees. Since calves themselves belong to the same limb as thighs covered by the original garment, a region identified as calf and a region identified as a body part covered by the original garment are fused.

It is noted herein that the original garment and the target garment are in mutual correspondence, where the original garment is a garment worn originally by a wearing part corresponding to the target garment on the human body. For example, if the target garment is tops, such as an upper outer garment, the wearing part corresponding to the tops on the human body is upper body (including arms), and the original garment is a garment originally worn by the upper body of the human body; and if the target garment is a cap, the wearing part corresponding to the cap on the human body is head, and the original garment is a cap or other ornaments or the like originally worn by the head of the human body.

The target garment image $T_c$, for example, an image of at least one garment of tops, trousers, shorts, cap, skirt, coat and the like, is an image of a garment to be tried on the human body in the first image I, which will be specifically set based on the requirement of actual virtual try-on. For example, an image denoted as c in FIG. 2 provides a specific example of the target garment image $T_c$.

The garment deformation template image $M_c^S$ in which a human body region covered by the target garment is marked is used to indicate a shape formed by deforming the original garment. The shape is determined based on the human body in the first image I and the shape of the target garment. An image denoted as d in FIG. 2 provides a specific example of the garment deformation template image $M_c^S$.

In the first human body template image $M_\omega^S$, a human body region not covered by the target garment is marked. The first human body template image $M_\omega^S$ and the garment deformation template image $M_c^S$ may be combined together to roughly represent a result of performing semantic segmentation on the second image generated by performing virtual try-on for the human body in the first image I. For example, an image denoted as e in FIG. 2 provides a specific example of the first human body template image $M_\omega^S$.

The garment deformation template image $M_c^S$ and the first human body template image $M_\omega^S$ may be generated based on the first semantic segmentation image $M^F$ of the first image and the target garment image $T_c$ in one of the following two manners (1) and (2).

(1) The first human body template image $M_\omega^S$ and garment deformation template image $M_c^S$ are obtained based only on the first semantic segmentation image $M^F$ and the target garment image $T_c$.

Herein, for example, the first human body template image $M_\omega^S$ and the garment deformation template image $M_c^S$ may be obtained by processing the first semantic segmentation image $M^F$ and the target garment image $T_c$ using a semantic generative network.

In one possible implementation, the semantic generative network may include, for example, a generative adversarial network. The generative adversarial network can fuse the first semantic segmentation image $M^F$ and the target garment image $T_c$ so as to generate the first human body template image $M_\omega^S$ and the garment deformation template image $M_c^S$ through different channels of the generative adversarial network.

In another possible implementation, in order to more accurately generate the first human body template image $M_\omega^S$ and the garment deformation template image $M_c^S$, the semantic generative network includes a first generative adversarial network and a second generative adversarial network. The first human body template image $M_\omega^S$ is generated through the first generative adversarial network, and the garment deformation template image $M_c^S$ is generated based on the first human body template image $M_\omega^S$ generated based on the first generative adversarial network through the second generative adversarial network.

The first generative adversarial network and the second generative adversarial network may be, for example, a conditional generative adversarial network (CGAN).

Specifically, an embodiment of the present disclosure further provides a specific process in which the first human body template image $M_\omega^S$ and the garment deformation template image $M_c^S$ are generated based on the first generative adversarial network and the second generative adversarial network in different steps, which specifically includes:

obtaining the first human body template image $M_\omega^S$ by processing the first semantic segmentation image $M^F$ and the target garment image $T_c$ using the first generative adversarial network;

obtaining the garment deformation template image $M_c^S$ by processing the first human body template image $M_\omega^S$ and the target garment image $T_c$ using the second generative adversarial network.

(2) The garment deformation template image $M_c^S$ and the first human body template image $M_\omega^S$ are generated based on the first semantic segmentation image $M^F$, a human body keypoint image $M_p$ and the target garment image $T_c$.

Herein, the human body keypoint image $M_p$ includes keypoint information of various parts of the human body and can represent a pose of the human body. Because the human body pose may have impact on the deformation of the target garment, when the garment deformation template image $M_c^S$ and the first human body template image $M_\omega^S$ are generated, more detail features of the human body can be learned using the human body keypoint image $M_p$, such that the generated garment deformation template image $M_c^S$ and the generated first human body template image $M_\omega^S$ are more fit to the reality and more precise.

The human body keypoint image $M_p$ may be obtained, for example, in the following manner including: generating the human body keypoint image $M_p$ representing keypoints of the human body pose by performing keypoint identification on the first image.

Specifically, for example, the first image I may be input into a pre-trained keypoint detection model and then the human body keypoint image $M_p$ is output by the keypoint detection model.

Specifically, when the garment deformation template image $M_c^S$ and the first human body template image $M_\omega^S$ are generated based on the first semantic segmentation image $M^F$, the human body keypoint image $M_p$ and the target garment image $T_c$, the first human body template image $M_\omega^S$ and the garment deformation template image $M_c^S$ may be obtained, for example, by processing the first semantic segmentation image $M^F$, the human body keypoint image $M_p$ and the target garment image $T_c$ using the semantic generative network.

Similar to the above (1), the semantic generative network may include, for example, a generative adversarial network. The first semantic segmentation image $M^F$, the human body keypoint image $M_p$ and the target garment image $T_c$ are processed using the generative adversarial network, such that the first human body template image $M_\omega^S$ and the garment deformation template image $M_c^S$ are obtained respectively through different channels of the generative adversarial network.

Furthermore, the semantic generative adversarial network may include, for example, a first generative adversarial network and a second generative adversarial network.

Firstly, the first human body template image $M_\omega^S$ is obtained by processing the first semantic segmentation image $M^F$, the human body keypoint image $M_p$ and the target garment image $T_c$ using the first generative adversarial network.

Next, the garment deformation template image $M_c^S$ is obtained by processing the first human body template image $M_\omega^S$, the human body keypoint image $M_p$ and the target garment image $T_c$ using the second generative adversarial network.

In the above step S102, deformation is performed on the target garment image $T_c$ based on the garment deformation template image $M_c^S$, that is, the target garment in the target garment image $T_c$ is deformed into a shape corresponding to the garment deformation template image $M_c^S$.

Specifically, the target garment deformation image $T_c^W$ may be obtained by performing deformation on the garment deformation template image $M_c^S$ and the target garment image $T_c$ using a garment deformation network in the embodiments of the present disclosure. For example, the target garment deformation image $T_c^W$ may be obtained by performing deformation on the target garment image $T_c$ using the garment deformation network based on the garment deformation template image $M_c^S$.

Illustratively, the garment deformation network may be, for example, a spatial transformation network (STN).

In one possible implementation, the garment deformation network takes the garment deformation template image $M_c^S$ and the target garment image $T_c$ as input to enable the target garment image $T_c$ to deform toward a shape indicated by the garment deformation template image $M_c^S$, thereby obtaining the target garment deformation image $T_c^W$.

An image denoted as f in FIG. 2 provides a specific example of the target garment deformation image $T_c^W$.

Figure 3:
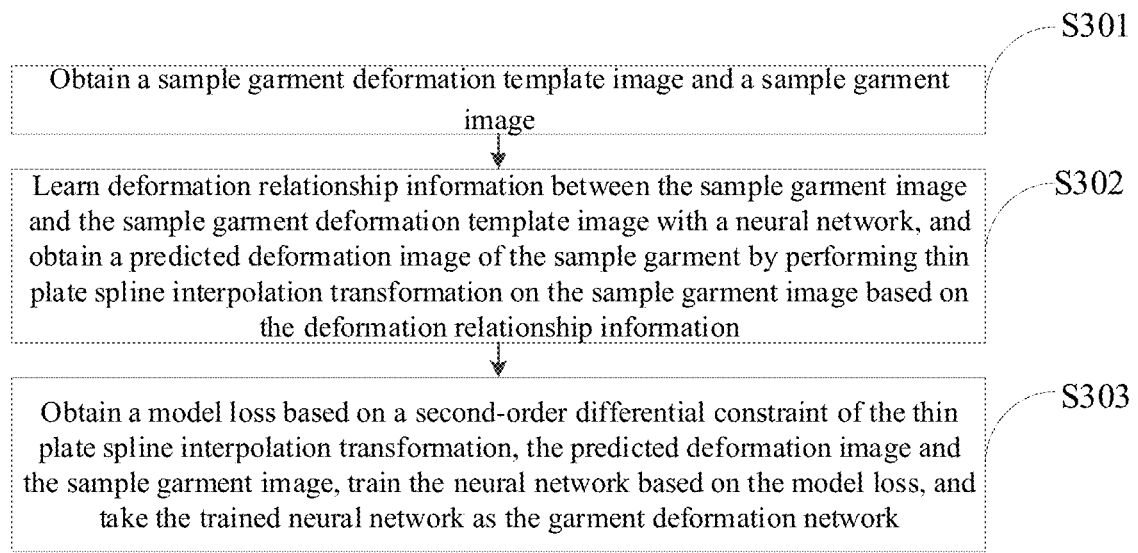
FIG. 3 is a flowchart illustrating a method of training a garment deformation network according to one or more embodiments of the present disclosure.

FIG. 3 is a flowchart illustrating a method of training a garment deformation network according to an embodiment of the present disclosure.

At step S301, a sample garment deformation template image and a sample garment image are obtained.

Herein, in the sample garment deformation template image, a shape into which the sample garment image is to deform is marked.

The sample garment deformation template image may be obtained, for example, in the following manner: a real deformation image of a sample garment is obtained, for example, an image is obtained after the sample garment is put on a human body of a person, and this image is the real deformation image of the sample garment; semantic segmentation is performed on the real deformation image corresponding to the sample garment; and the sample garment deformation template image is obtained based on a result of performing semantic segmentation on the real deformation image corresponding to the sample garment.

At step S302, deformation relationship information between the sample garment image and the sample garment deformation template image is learned with a neural network, and a predicted deformation image of the sample garment is obtained by performing thin plate spline interpolation transformation on the sample garment image based on the deformation relationship information.

At step S303, a model loss is obtained based on a second-order differential constraint of the thin plate spline interpolation transformation, the predicted deformation image and the sample garment image; the neural network is trained based on the model loss; and the trained neural network is taken as the garment deformation network.

Herein, the model loss includes two parts: a first loss $L_1$ corresponding to the second-order differential constraint, and a second loss $L_2$ determined based on the predicted deformation image and the real deformation image.

The first loss corresponding to the second-order differential constraint, for example, satisfies the following formula (1):

$$L_1 = \Sigma_{p \in P} \lambda_r (|\|pp_0\|_1 - \|pp_1\|_1| + |\|pp_2\|_1 - \|pp_3\|_1|) + \lambda_s(|S(p, p_0) - S(p, p_1)| + |S(p, p_2) - S(p, p_3)|) \quad (1)$$

In the formula, $\lambda_r$ and $\lambda_s$ respectively represent weight hyper-parameters, and P represents a set of sampling control points.

p(x, y) represents one sampling control point when thin plate spline interpolation transformation is performed on the sample garment image, x, y respectively represents a coordinate value of the sampling control point in the sample garment image; $p_0(x_0, y_0)$, $p_1(x_1, y_1)$, $p_2(x_2, y_2)$ and $p_3(x_3, y_3)$ respectively represent four points around the p(x, y), that is, located at the upper, lower, right and left sides of the p(x, y).

$pp_i$ represents a vector from the sampling control point p to $p_i$.

$$S(p, p_i) = \frac{y_i - y}{x_i - x};$$

$i \in \{0,1,2,3\}$ represents a slope between the two points p and $p_i$.

Through the second-order differential constraint, two properties of the affine transformation, i.e. collinearity and corresponding line segments having same proportion, are introduced into the process of deformation of the sample garment, thereby reducing occurrence of excessive twist deformation during the deformation of the sample garment, and improving the fidelity of the deformed garment.

In another embodiment of the present disclosure, in order to avoid occurrence of error of division by zero in solving a slope, the formula $|S(p, p_i)-S(p, p_j)|$ may be replaced with the following formula (2):

$$|S(p, p_i) - S(p, p_j)| = |(y_i - 1)(x_j - x) - (y_j - 1)(x_i - x)| \quad (2)$$

where $(i,j) \in \{(0,1), (2,3)\}$;

That is, the first loss $L_1$ corresponding to the second-order differential constraint, for example, further satisfies the following formula (3):

$$L_1 = \Sigma_{p \in P} \lambda_r (|\|pp_0\|_1 - \|pp_1\|_1| + |\|pp_2\|_1 - \|pp_3\|_1|) + \lambda_s(|(y_0 - 1)(x_1 - x) - (y_1 - 1)(x_0 - x)| + |(y_2 - 1)(x_3 - x) - (y_3 - 1)(x_2 - x)|) \quad (3)$$

The second loss $L_2$ determined based on the predicted deformation image and the real deformation image satisfies the following formula (4):

$$L_2 = \|T_c^{W'} - I_c'\|_1 \quad (4)$$

In the formula, $T_c^{W'}$ represents a predicted deformation image, $I_c'$ represents a sample garment image. The second loss $L_2$ represents a deformation loss of a sample garment.

Finally, the model loss $L_w$ satisfies the following formula (5):

$$L_w = L_1 + L_2 \quad (5)$$

Next, the neural network is trained based on the model loss $L_w$. The trained neural network is taken as the garment deformation network.

In the above step S103, when a virtual try-on is carried out, a region unchanged in the first image needs to be preserved as possible in order to increase the fidelity of the virtual try-on.

For this purpose, the second semantic segmentation image of the human body in the first image I is firstly obtained in the embodiments of the present disclosure. The second semantic segmentation image includes: a first semantic segmentation sub-image $M_c$ in which a human body part covered by the original garment in the first image is marked, and a second semantic segmentation sub-image $M_\omega$ in which a human body part not covered by the original garment in the first image is marked.

Next, combination of non-target limbs is performed based on the first semantic segmentation sub-image $M_c$, the second semantic segmentation sub-image $M_\omega$, the garment deformation template image $M_c^S$ and the first human body template image $M_\omega^S$.

Herein, the non-target limbs refer to human body regions not covered by the target garment.

Because the second human body template image $M_\omega^C$ combines the features of the first human body template image $M_\omega^S$, the first semantic segmentation sub-image $M_c$, the second semantic segmentation sub-image $M_\omega$, and the garment deformation template image $M_c^S$, the second human body template image $M_\omega^C$ can more really indicate the human body region not covered by the target garment and thus have higher precision, compared with the first human body template image $M_\omega^S$ generated in step S101.

An image denoted as g in FIG. 2 provides a specific example of the first semantic segmentation sub-image $M_c$; and an image denoted as h in FIG. 2 provides a specific example of the second semantic segmentation sub-image $M_\omega$.

An image denoted as i in FIG. 2 provides a specific example of the second human body template image $M_\omega^C$. Through comparison between the first human body template image $M_\omega^S$ denoted as e in FIG. 2 and the second human body template image $M_\omega^C$ denoted as i in FIG. 2, it can be clearly seen that the second human body template image $M_\omega^C$ has higher precision than the first human body template image $M_\omega^S$.

The first semantic segmentation sub-image $M_c$ and the second semantic segmentation sub-image $M_\omega$ can be combined together to form the second semantic segmentation image obtained by performing semantic segmentation on the first image.

In one possible implementation, the second semantic segmentation image may be a semantic segmentation image M obtained by performing semantic segmentation on the first image.

Figure 4:
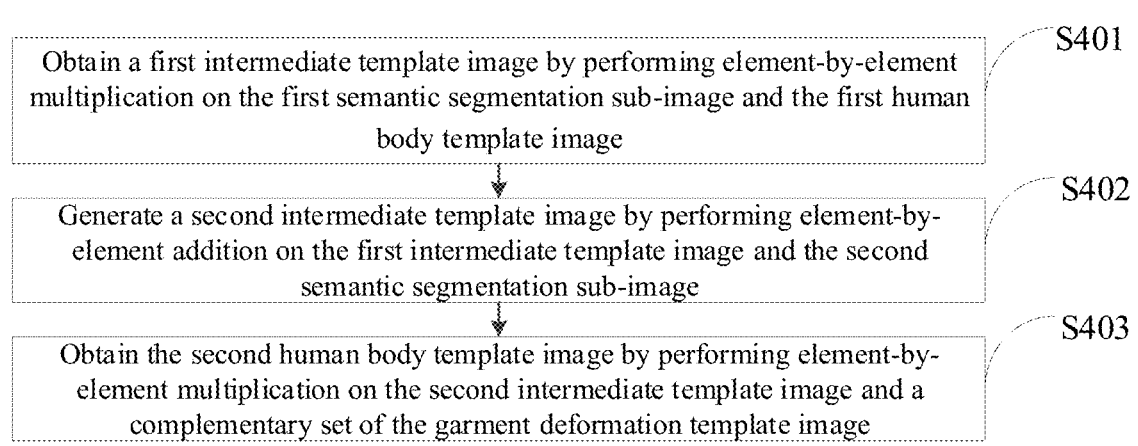
FIG. 4 is a flowchart illustrating a method of generating a second human body template image $M_\omega^C$ according to one or more embodiments of the present disclosure.

As shown in FIG. 4, an embodiment of the present disclosure further provides a specific manner in which the second human body template image $M_\omega^C$ is obtained by adjusting the first human body template image $M_\omega^S$ based on the second semantic segmentation image of the human body in the first image and the garment deformation template image $M_c^S$, which specifically includes steps S401-S403.

At step S401, a first intermediate template image $M_a^G$ is obtained by performing element-by-element multiplication on the first semantic segmentation sub-image $M_c$ and the first human body template image $M_\omega^S$.

The first intermediate template image $M_a^G$ includes a first sub-template image in which a human body region covered by the original garment but not covered by the target garment is marked, and/or a second sub-template image in which a human body region covered by the target garment but not covered by the original garment is marked.

For example, an image denoted as j in FIG. 2 provides a specific example of the first intermediate template image $M_a^G$. In the first intermediate template image $M_a^G$ denoted as j in FIG. 2, because the original garment is a long-sleeved tops and the target garment is a short-sleeved tops, a human body region covered by the original garment but not covered by the target garment is marked.

At step S402, a second intermediate template image is generated by performing element-by-element addition on the first intermediate template image $M_a^G$ and the second semantic segmentation sub-image $M_\omega$.

Herein, actually, the formed second intermediate template image is obtained by combining together the human body regions marked in the first intermediate template image $M_a^G$ and the second semantic segmentation sub-image $M_\omega$ respectively.

At step S403, the second human body template image $M_\omega^C$ is obtained by performing element-by-element multiplication on the second intermediate template image and a complementary set of the garment deformation template image $M_c^S$.

The example of the process can be expressed by the following formulas (6) and (7):

$$M_a^G = M_\omega^S \odot M_c \quad (6)$$

$$M_\omega^C = (M_a^G + M_\omega) \odot (1 - M_c^S) \quad (7)$$

In the formulas, $\odot$ represents element-by-element multiplication; + represents element-by-element addition; $1-M_c^S$ represents the complementary set of the garment deformation template image $M_c^S$.

In the above process, the second human body template image $M_\omega^C$ always maintains a layout similar to that of the first human body template image $M_\omega^S$, and the unaligned pixels of the second human body template image $M_\omega^C$ and the first human body template image $M_\omega^S$ are eliminated.

In the above process, the part of non-target limb is preserved precisely in combination with the first semantic segmentation sub-image $M_c$ and the second semantic segmentation sub-image $M_\omega$, such that details of the part of the non-target limb can be fully restored in the entire process of the image processing so as to fully preserve corresponding details in the first image. Further, under the guidance of the generated first intermediate template image $M_a^G$, a body part region which is coherent with the human body part covered by the target garment and is covered by the original garment in the first image can be identified. This way, it is ensured that loss of a body part in the generated second image $I^S$ due to a particular body part which is covered by the original garment but not covered by the target garment will not occur. Thus, the precision of the generated second image $I^S$ is further improved.

Transforming the first image into the second image $I^S$ including the human body wearing the target garment based on the target garment deformation image $T_c^W$, the second human body template image $M_\omega^C$ and the garment deformation template image $M_c^S$ in the above step S104 actually means obtaining the second image $I^S$ by fusing the target garment deformation image $T_c^W$, the second human body template image $M_\omega^C$, the garment deformation template image $M_c^S$ and the first image.

An image denoted as o in FIG. 2 provides a specific example of the second image $I^S$.

Figure 5:
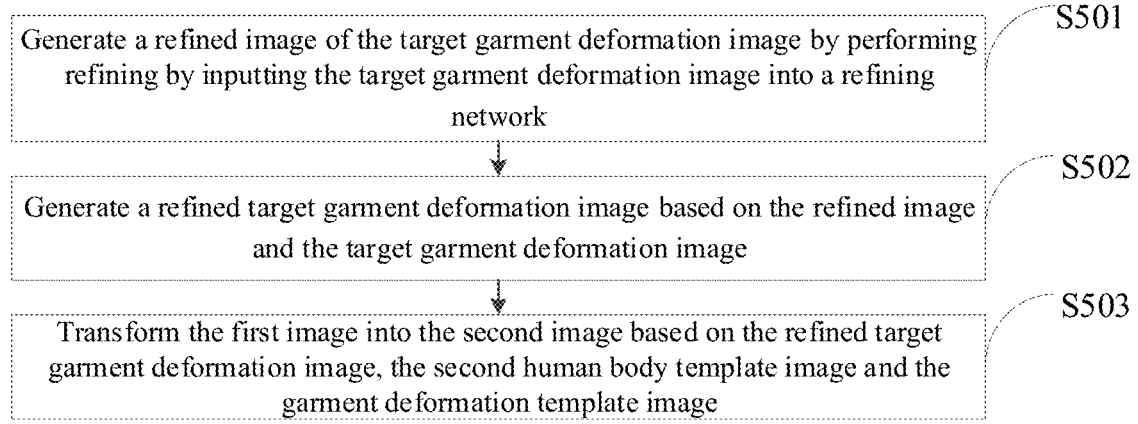
FIG. 5 is a flowchart illustrating a method of obtaining a second image $I^S$ according to one or more embodiments of the present disclosure.

Specifically, as shown in FIG. 5, an embodiment of the present disclosure further provides a specific method of obtaining the second image $I^S$. The method includes steps S501-S503.

At step S501, a refined image $T_c^{R'}$ of the target garment deformation image $T_c^W$ is generated by performing refining by inputting the target garment deformation image $T_c^W$ into a refining network.

At step S502, a refined target garment deformation image $T_c^R$ is generated based on the refined image $T_c^{R'}$ and the target garment deformation image $T_c^W$.

Herein, the refining network can perform feature learning for the target garment deformation image $T_c^W$ to learn more details of the target garment, so as to generate the refined image $T_c^{R'}$ including more detail features of the target garment deformation image and a learning matrix $\alpha$.

The learning matrix is used to maintain the texture of the target garment, and an element value $\alpha_{ij}$ of any one element in the learning matrix $\alpha$ satisfies $0 \leq \alpha_{ij} \leq 1$.

Finally, the refined target garment deformation image $T_c^R$ is obtained based on the refined image $T_c^{R'}$ generated based on the refining network, the target garment deformation image $T_c^W$ and the learning matrix $\alpha$.

The refined target garment deformation image $T_c^R$, for example, satisfies the following formula (8):

$$T_c^R = (1 - \alpha) \odot T_c^W + \alpha \odot T_c^{R'} \quad (8)$$

An image denoted as k in FIG. 2 provides a specific example of the refined image $T_c^{R'}$ generated based on the refining network. An image denoted as l in FIG. 2 provides a specific example of the refined target garment deformation image $T_c^R$.

At step S503, the first image is transformed into the second image based on the refined target garment deformation image $T_c^R$, the second human body template image $M_\omega^C$ and the garment deformation template image $M_c^S$.

Herein, when the second image $I^S$ is generated, a human body image $I_\omega$ in which body regions covered by the target garment and the original garment are removed is firstly generated based on the first image, the second semantic segmentation image of the first image and the garment deformation template image $M_c^S$; then, the second image $I^S$ is obtained by fusing the refined target garment deformation image $T_c^R$, the second human body template image $M_\omega^C$, the garment deformation template image $M_c^S$ and the human body image $I_\omega$.

When the human body image $I_\omega$ is generated, an intermediate human body image $I_{\omega'}$ in which a body region covered by the original garment is removed is generated based on the first image and the second semantic segmentation image of the first image.

Herein, the intermediate human body image $I_{\omega'}$, for example, satisfies the following formula (9):

$$I_{\omega'} = I \odot (1 - M_c) \qquad (9)$$

In the formula, $1-M_c$ represents a complementary set of the first semantic segmentation sub-image $M_c$; herein, since in the first semantic segmentation sub-image $M_c$, a human body part covered by the original garment in the first image is marked, the complementary set of the first semantic segmentation sub-image $M_c$ represents a human body part not covered by the original garment in the first image; then, the intermediate human body image $I_{\omega'}$ in which a human body region covered by the original garment is removed is obtained by performing element-by-element multiplication on the first image I and the complementary set.

Alternatively, the intermediate human body image $I_{\omega'}$ may also satisfy the following formula (10):

$$I_{\omega'} = I \odot M_{\omega} \qquad (10)$$

In the second semantic segmentation sub-image $M_{\omega}$, a human body part not covered by the original garment in the first image is marked, and therefore, the intermediate human body image $I_{\omega'}$ in which a human body region covered by the original garment is removed is obtained by performing element-by-element multiplication on the first image I and the second semantic segmentation sub-image $M_{\omega}$.

Then, a region covered by the target garment in the intermediate human body image $I_{\omega'}$ is removed based on the intermediate human body image $I_{\omega'}$ and the garment deformation template image $M_c^S$.

The human body image $I_{\omega}$ may, for example, satisfy the following formula (11):

$$I_{\omega} = I_{\omega'} \odot (1 - M_c^S) \qquad (11)$$

In the formula, $\odot$ represents element-by-element multiplication; and $1-M_c^S$ represents a complementary set of the garment deformation template image $M_c^S$.

An image denoted as m in FIG. 2 provides a specific example of the human body image $I_{\omega}$.

When fusion is performed on the refined target garment deformation image $T_c^R$, the second human body template image $M_{\omega}^C$, the garment deformation template image $M_c^S$ and the human body image $I_{\omega}$, the refined target garment deformation image $T_c^R$, the second human body template image $M_{\omega}^C$, the garment deformation template image $M_c^S$ and the human body image $I_{\omega}$ can be cascaded and then input into a pre-trained fusion network to obtain the second image $I^S$.

Figure 6:
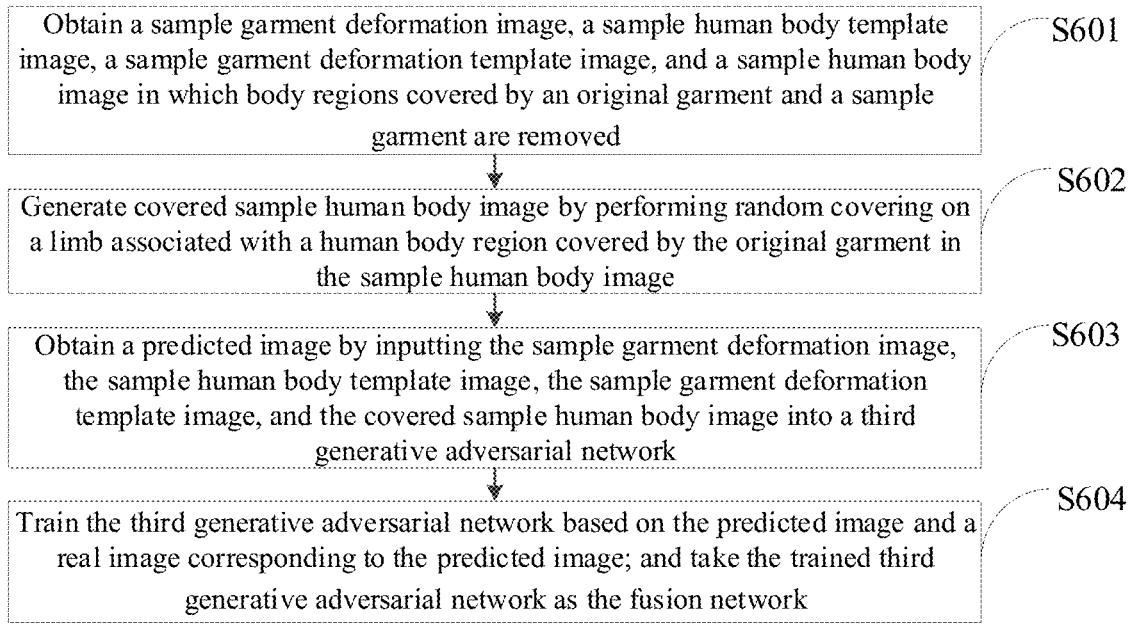
FIG. 6 is a flowchart illustrating a method of training a fusion network according to one or more embodiments of the present disclosure.

Herein, as shown in FIG. 6, the fusion network can be obtained, for example, in the following steps S601-S604.

At step S601, a sample garment deformation image, a sample human body template image, a sample garment deformation template image, and a sample human body image in which body regions covered by an original garment and a sample garment are removed are obtained.

At step S602, a covered sample human body image is generated by performing random covering on a limb associated with a human body region covered by the original garment in the sample human body image.

Herein, for example, if the original garment is tops and the limb associated with the covered region by the original garment is arm and hand, the covered sample human body image may be generated by performing random covering on the arm or hand associated with the human body region covered by the original garment in the sample human body image.

At step S603, a predicted image is obtained by inputting the sample garment deformation image, the sample human body template image, the sample garment deformation template image, and the covered sample human body image into a third generative adversarial network.

At step S604, the third generative adversarial network is trained based on the predicted image and a real image corresponding to the predicted image; and the trained third generative adversarial network is taken as the fusion network.

The third generative adversarial network may be, for example, a conditional generative adversarial network (CGAN).

In this case, during a training process of the fusion network, a local adaptive capability of the fusion network is fully utilized to perform random covering on a limb, such that the fusion network can realize the repair of the limb. Thus, during a virtual try-on process, if a re-dressed image loses a particular part of the human body, the fusion network can supplement this part to produce a second image with higher fidelity.

For example, if the target garment is short-sleeved tops and the original garment is long-sleeved tops, when a covering area of the original garment for the arm is greater than that of the target garment, there may be loss of the arm part after the target garment is tried on the human body. The fusion network according to the embodiments of the present disclosure can supplement the lost arm part to produce a re-dressed image with better fidelity.

In the embodiments of the present disclosure, the garment deformation template image $M_c^S$ and the first human body template image $M_{\omega}^S$ are generated firstly based on the first semantic segmentation image $M^F$ of the human body in the first image I and the target garment image $T_c$, and then the target garment deformation image $T_c^W$ is generated by performing deformation on the target garment image $T_c$ based on the garment deformation template image $M_c^S$, and then the second human body template image $M_{\omega}^C$ is generated based on the second semantic segmentation image of the human body in the first image, the garment deformation template image $M_c^S$ and the first human body template image $M_{\omega}^S$, and finally, the second image $I^S$ including the human body wearing the target garment is obtained based on the target garment deformation image $T_c^W$, the second human body template image $M_{\omega}^C$, the garment deformation template image $M_c^S$ and the first image. In the process, detail information of the human body is fully utilized, the loss of details in the try-on process is reduced, and the fidelity of the re-dressed image is improved.

Furthermore, in an embodiment of the present disclosure, a human body keypoint image representing keypoints of a human body pose is further utilized to generate the garment deformation template image and the first human body template image, and the information of the human body pose is further fully utilized to enable the generated garment deformation template image and the generated first human body template image to have higher precision. In this way, the deformed garment image obtained by deforming the target garment is more fit to the human body pose and has higher precision. Moreover, in the second human body template image generated based on the first human body template image, a body region not covered by the target garment on the human body can be more precisely marked, such that the finally-generated second image has higher fidelity.

Furthermore, in the embodiments of the present disclosure, when deformation is performed for the target garment image based on the garment deformation template image, the garment deformation network used herein may introduce two properties of affine transformation, i.e. collinearity and corresponding line segments having same proportion, to the deformation process of a sample garment through the second-order differential constraint in the training, thus reducing occurrence of excessive twist deformation during deformation of the sample garment, obtaining a better garment feature preservation result and improving the fidelity of the deformed garment.

Furthermore, in the embodiments of the present disclosure, the fusion network is used to perform fusion for the refined target garment deformation image $T_c^R$, the second human body template image $M_\omega^C$, the garment deformation template image $M_c^S$ and the human body image $I_\omega$; during training, the fusion network may perform random covering on a limb associated with a human body region covered by the original garment in the sample human body image based on the principle of image inpainting, such that the fusion network can supplement the lost body part in the re-dressed image. The second image obtained hereby has higher fidelity.

Figure 7:
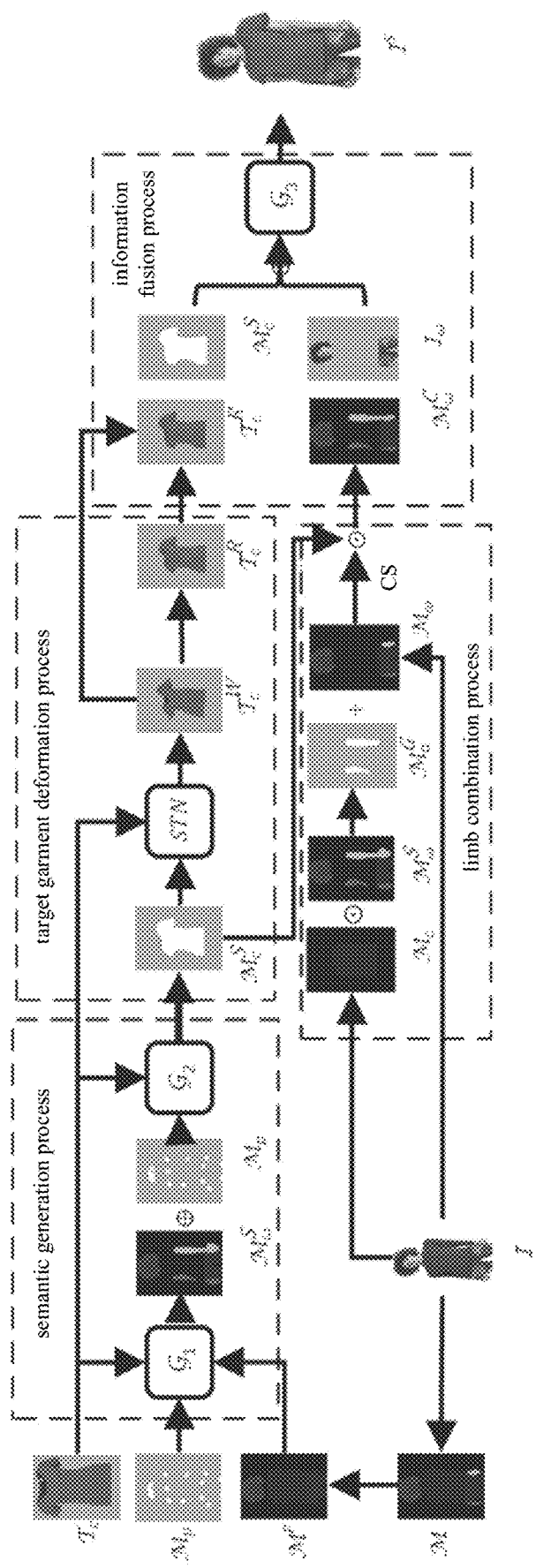
FIG. 7 is an entire architecture diagram illustrating an image processing method according to one or more embodiments of the present disclosure.

FIG. 7 is an entire architecture diagram illustrating an image processing method according to one or more embodiments of the present disclosure. This entire architecture diagram includes a first image pre-processing process 710, a semantic generation process 720, a target garment deformation process 730, a limb combination process 740 and an information fusion process 750.

The first image pre-processing process 710 includes steps 711-713.

At step 711, a second semantic segmentation image M of a human body in a first image is obtained by performing semantic segmentation on the first image; the second semantic segmentation image includes a first semantic segmentation sub-image $M_c$ and a second semantic segmentation sub-image $M_\omega$.

At step 712, a first semantic segmentation image $M^F$ is generated by fusing at least two of the semantic segmentation regions belonging to a same limb and having different semantic segmentation results in the second semantic segmentation image M.

At step 713, a human body keypoint image $M_p$ representing keypoints of a human body pose is generated by performing keypoint identification on the first image.

The semantic generation process 720 includes steps 721-722.

At step 721, a first human body template image $M_\omega^S$ is obtained by inputting the first semantic segmentation image $M^F$, the human body keypoint image $M_p$ and the target garment image $T_c$ into a first generative adversarial network G1.

At step 722, a garment deformation template image $M_c^S$ is obtained by inputting the first human body template image $M_\omega^S$, the human body keypoint image $M_p$ and the target garment image $T_c$ into a second generative adversarial network G2.

Illustratively, G1 and G2 both are CGANs.

The target garment deformation process 730 includes steps 731-733.

At step 731, a target garment deformation image $T_c^W$ is obtained by inputting the garment deformation template image $M_c^S$ and the target garment image $T_c$ into a garment deformation network (Spatial Transformation Network, STN).

At step 732, a refined image $T_c^{R'}$ is obtained by performing refining by inputting the target garment deformation image $T_c^W$ into a refining network.

At step 733, a refined target garment deformation image $T_c^R$ is obtained based on the image $T_c^{R'}$ and the target garment deformation image $T_c^W$.

The limb combination process 740 includes steps 741-745.

At step 741, a first intermediate template image $M_a^G$ is obtained by performing element-by-element multiplication on the first semantic segmentation sub-image $M_c$ and the first human body template image $M_\omega^S$.

At step 742, a second intermediate template image is obtained by performing element-by-element addition on the first intermediate template image $M_a^G$ and the second semantic segmentation sub-image $M_\omega$.

At step 743, a second human body template image $M_\omega^C$ is obtained by performing element-by-element multiplication on the second intermediate template image and a complementary set of the garment deformation template image $M_c^S$.

At step 744, an intermediate human body image $I_{\omega'}$ in which a body region covered by the original garment is removed is generated based on the first image and the second semantic segmentation image of the first image.

At step 745, a human body image $I_\omega$ is obtained by removing a body region covered by the target garment in the intermediate human body image $I_{\omega'}$ based on the intermediate human body image $I_{\omega'}$ and the garment deformation template image $M_c^S$.

Herein, the steps 741 and 744 may be performed in any sequence.

The information fusion process 750 includes step 751.

At step 751, the second image $I^S$ is obtained by concatenating and inputting the refined target garment deformation image $T_c^R$, the second human body template image $M_\omega^C$, the garment deformation template image $M_c^S$, and the human body image $I_\omega$ into a pre-trained fusion network G3.

Through the above examples, the virtual try-on of the first image can be achieved with higher try-on fidelity.

Based on the same idea, the embodiments of the present disclosure further provide an image processing apparatus corresponding to the image processing method. The principle of the apparatus to solve problems in the embodiments of the present disclosure is similar to that of the above image processing method in the embodiments of the present disclosure. Thus the implementation of the apparatus can be referred to the implementation of the method and will not be repeated herein.

Figure 8:
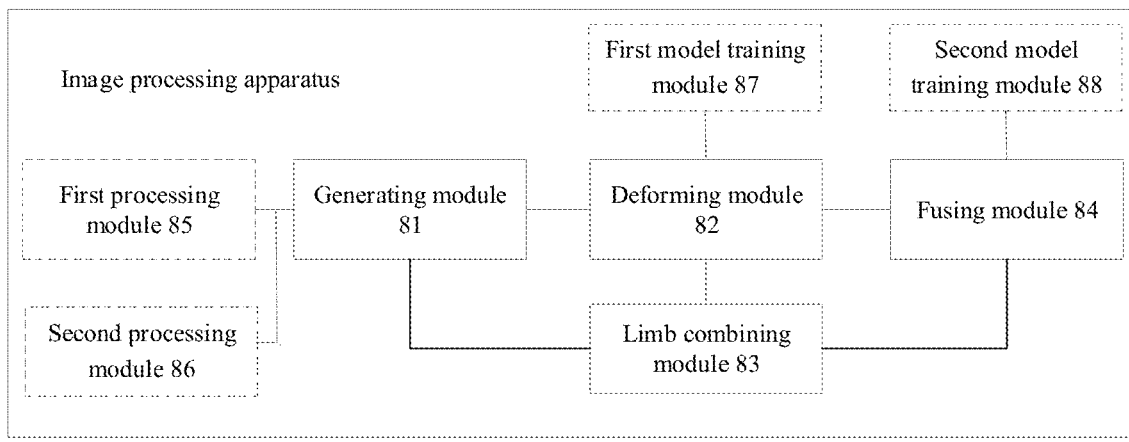
FIG. 8 is a schematic diagram illustrating an image processing apparatus according to one or more embodiments of the present disclosure.

FIG. 8 is a schematic diagram illustrating an image processing apparatus according to one or more embodiments of the present disclosure. The apparatus includes: a generating module 81, a deforming module 82, a limb combining module 83 and a fusing module 84.

The generating module 81 is configured to generate a garment deformation template image and a first human body template image based on a first semantic segmentation image of a human body in a first image and a target garment image, where in the first human body template image, a human body region not covered by a target garment is marked.

The deforming module 82 is configured to generate a target garment deformation image by performing deformation on the target garment image based on the garment deformation template image.

The limb combining module 83 is configured to obtain a second human body template image by adjusting the first human body template image based on a second semantic segmentation image of the human body in the first image and the garment deformation template image.

The fusing module 84 is configured to transform the first image into a second image including a human body wearing the target garment based on the target garment deformation image, the second human body template image, and the garment deformation template image.

In the embodiments of the present disclosure, various template images are obtained by use of the second semantic segmentation image of the first image and the target garment image, and the second image including a human body wearing the target garment is finally obtained by adjusting the first image and the target garment image based on various template images and the semantic segmentation images. In the above process, detail information of the human body is fully extracted by use of the semantic segmentation technology. In this way, detail loss in a try-on process can be reduced, and a fidelity of an image after try-on is further improved.

In one possible implementation, the image processing apparatus further includes: a first processing module 85, configured to generate a human body keypoint image representing keypoints of a human body pose by performing keypoint identification on the first image. When generating the garment deformation template image and the first human body template image based on the first semantic segmentation image of the first image and the target garment image, the generating module 81 is specifically configured to: generate the garment deformation template image and the first human body template image based on the first semantic segmentation image, the human body keypoint image and the target garment image.

In one possible implementation, when generating the garment deformation template image and the first human body template image based on the first semantic segmentation image, the human body keypoint image and the target garment image, the generating module 81 is configured to: obtain the first human body template image and the garment deformation template image by processing the first semantic segmentation image, the human body keypoint image and the target garment image with a semantic generative network.

In one possible implementation, the semantic generative network includes: a first generative adversarial network and a second generative adversarial network.

When obtaining the first human body template image and the garment deformation template image by processing the first semantic segmentation image, the human body keypoint image and the target garment image with the semantic generative network, the generating module 81 is configured to: obtain the first human body template image by processing the first semantic segmentation image, the human body keypoint image and the target garment image with the first generative adversarial network; obtain the garment deformation template image by processing the first human body template image, the human body keypoint image and the target garment image with the second generative adversarial network.

In one possible implementation, the image processing apparatus further includes a second processing module 86, configured to generate the first semantic segmentation image in the following manner including: generating a raw semantic segmentation image by performing semantic segmentation on the first image; where the raw semantic segmentation image includes semantic segmentation regions respectively corresponding to different parts of the human body in the first image; generating the first semantic segmentation image by fusing at least two of the semantic segmentation regions belonging to a same limb and having different semantic segmentation results in the raw semantic segmentation image.

In one possible implementation, when generating the target garment deformation image by performing deformation on the target garment image based on the garment deformation template image, the deforming module 82 is configured to: obtain the target garment deformation image by performing deformation on the target garment image with a garment deformation network based on the garment deformation template image.

In one possible implementation, the image processing apparatus further includes a first model training module 87 configured to train the garment deformation network in the following manner including: obtaining a sample garment deformation template image and a sample garment image; learning deformation relationship information between the sample garment image and the sample garment deformation template image with a neural network, and obtaining a predicted deformation image of the sample garment image by performing thin plate spline interpolation transformation on the sample garment image based on the deformation relationship information; obtaining a model loss based on a second-order differential constraint of the thin plate spline interpolation transformation, the predicted deformation image and the sample garment image, and training the neural network based on the model loss; taking the trained neural network as the garment deformation network.

In one possible implementation, different parts of the human body in the first image are marked in the first semantic segmentation image; the second semantic segmentation image includes: a first semantic segmentation sub-image in which a human body part covered by an original garment in the first image is marked; and a second semantic segmentation sub-image in which a human body part not covered by the original garment in the first image is marked.

In one possible implementation, when obtaining the second human body template image by adjusting the first human body template image based on the second semantic segmentation image of the human body in the first image and the garment deformation template image, the limb combining module 83 is configured to: obtain a first intermediate template image by performing element-by-element multiplication on the first semantic segmentation sub-image and the first human body template image; where the first intermediate template image includes a first sub-template image in which a human body region covered by the original garment but not covered by the target garment is marked, and/or, a second sub-template image in which a human body region covered by the target garment but not covered by the original garment is marked; generate a second intermediate template image by performing element-by-element addition on the first intermediate template image and the second semantic segmentation sub-image; obtain the second human body template image by performing element-by-element multiplication on the second intermediate template image and a complementary set of the garment deformation template image.

In one possible implementation, when transforming the first image into the second image including a human body wearing the target garment based on the target garment deformation image, the second human body template image, and the garment deformation template image, the fusing module 84 is configured to: generate a refined image of the target garment deformation image by performing refining by inputting the target garment deformation image into a refining network; generate a refined target garment deformation image based on the refined image and the target garment deformation image; transform the first image into the second image based on the refined target garment deformation image, the second human body template image and the garment deformation template image. In one possible implementation, when transforming the first image into the second image based on the refined target garment deformation image, the second human body template image and the garment deformation template image, the fusing module 84 is configured to: generate a human body image in which regions covered by the target garment and the original garment are removed, based on the first image, the second semantic segmentation image of the first image, and the garment deformation template image; obtain the second image by fusing the refined target garment deformation image, the second human body template image, the garment deformation template image and the human body image.

In one possible implementation, when obtaining the second image by fusing the refined target garment deformation image, the second human body template image, the garment deformation template image and the human body image, the fusing module 84 is configured to: obtain the second image by concatenating and inputting the refined target garment deformation image, the second human body template image, the garment deformation template image and the human body image into a pre-trained fusion network.

In one possible implementation, the image processing apparatus further includes a second model training module 88 configured to train the fusion network in the following manner including: obtaining a sample garment deformation image, a sample human body template image, a sample garment deformation template image, and a sample human body image with in which regions covered by a sample garment and an original garment are removed; generating a covered sample human body image by performing random covering for a limb associated with a human body region covered by the original garment in the sample human body image; obtaining a predicted image by inputting the sample garment deformation image, the sample human body template image, the sample garment deformation template image, and the covered sample human body image into a third generative adversarial network; training the third generative adversarial network based on the predicted image and a real image corresponding to the predicted image; taking the trained third generative adversarial network as the fusion network.

The descriptions of the processing flows and interaction flows of various modules in the apparatus may be referred to the relevant descriptions of the above method embodiments and will not be repeated herein.

Figure 9:
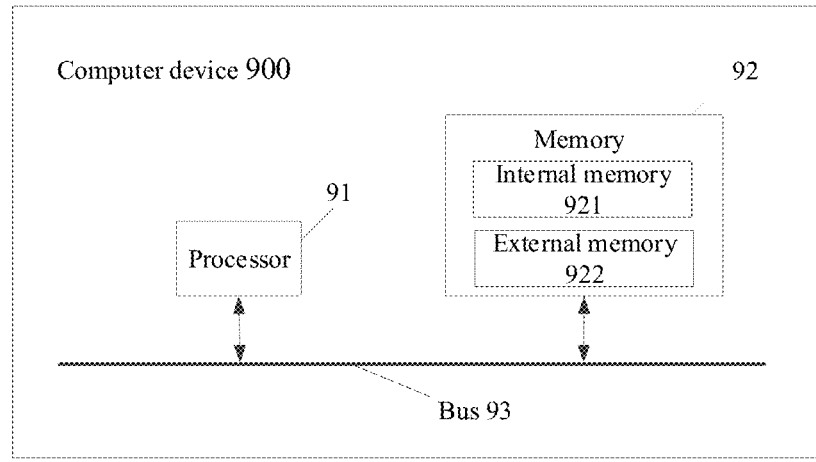
FIG. 9 is a schematic diagram illustrating a computer device according to one or more embodiments of the present disclosure.

An embodiment of the present disclosure further provides a computer device 900. FIG. 9 is a structural schematic diagram of the computer device 900 according to an embodiment of the present disclosure. The computer device 900 includes a processor 91, a memory 92 and a bus 93. The memory 92 is used to store machine readable instructions executable by the processor 91, and includes a memory 921 and an external memory 922. The memory 921 herein is also called an internal memory which is used to temporarily store operation data of the processor 91 and data exchanged with the external memory 922 such as hard disk. The processor 91 exchanges data through the memory 921 and the external memory 922. When the processor 91 executes the machine readable instructions, the processor 91 communicates with the memory 92 via the bus 93 such that the machine readable instructions cause the processor 91 to implement the image processing method according to the embodiments of the present disclosure.

An embodiment of the present disclosure further provides a computer readable storage medium storing computer programs. The computer programs are executed by a processor to implement the steps of the image processing method according to the above method embodiments.

An embodiment of the present disclosure further provides a computer program product for an image processing method, including a computer readable storage medium storing program codes. The program codes include instructions used to implement the steps of the image processing method according to the above method embodiments. Reference may be made to the above method embodiments for specific details and no redundant descriptions are made herein. For example, an embodiment of the present disclosure further provides a computer program product including computer instructions. The computer instructions are executed by a processor to implement the image processing method according to the above embodiments.

Those skilled in the art may clearly understand that for convenience and simplification of descriptions, the specific working processes of the above system and apparatus may be referred to the corresponding processes of the above method embodiments and will not be repeated herein. In the several embodiments of the present disclosure, it should be understood that the system, apparatus and method disclosed herein may be implemented in another way. The apparatus embodiments described above are merely illustrative, for example, the division of the units is only a logic functional division and the units may be divided another way in actual implementation. For another example, a plurality of unit or components may be combined or integrated into another system or some features therein may be neglected or not executed. Furthermore, those mutual couplings, or direct couplings or communication connections shown or discussed herein may be made through some communication interfaces, and indirect couplings or communication connections between apparatuses or units are in electrical or mechanical form or the like.

The units described as separate members may be or not be physically separated, and the members displayed as units may be or not be physical units, i.e., may be located in one place, or may be distributed to a plurality of network units. Part or all of the units may be selected according to actual requirements to implement the objectives of the solutions in the embodiments.

Furthermore, various functional units in various embodiments of the present disclosure may be integrated into one processing unit, or may be present physically separately, or two or more units thereof may be integrated into one unit.

The functions, if implemented in the form of software functional units and sold or used as independent products, may be stored in a non-volatile computer-readable storage medium. Based on such understanding, the technical scheme of the present disclosure essentially or a part contributing to the prior art or part of the technical scheme may be embodied in the form of a software product, the software product is stored in a storage medium, and includes several instructions for enabling a computer device (such as a personal computer, a server or a network device) to execute all or part of the steps of the method disclosed by the embodiments of the present disclosure; and the above storage mediums include various mediums such as a USB disk, a mobile hard disk, a read-only memory (ROM), a random access memory (RAM), a diskette or a compact disk and the like which may store program codes.

Finally, it should be noted that the above embodiments are merely specific implementations of the present disclosure which are used to describe the technical solutions of the present disclosure rather than limit the present disclosure. The scope of protection of the present disclosure is not limited hereto. Although detailed descriptions are made to the present disclosure by referring to the preceding embodiments, those skilled in the art should understand that any person of this prior art may still make modifications or easily-conceivable changes to the technical solutions recorded in the above embodiments or make equivalent substitutions to part of technical features therein within the technical scope of the present disclosure. Such modifications, changes and substitutions will not cause the essence of the corresponding technical solutions to depart from the spirit and scope of the technical solutions of the embodiments of the present disclosure and shall all fall within the scope of protection of the present disclosure. Therefore, the scope of protection of the present disclosure is indicated by the appended claims.

The invention claimed is:

1. An image processing method, comprising:
    generating, by at least one processor, a garment deformation template image and a first human body template image based on a first semantic segmentation image of a human body in a first image and a target garment image, wherein, in the first human body template image, a human body region not covered by a target garment is marked;
    generating, by the at least one processor, a target garment deformation image by performing deformation on the target garment image based on the garment deformation template image;
    obtaining, by the at least one processor, a second human body template image by adjusting the first human body template image based on a second semantic segmentation image of the human body in the first image and the garment deformation template image; and
    transforming, by the at least one processor, the first image into a second image comprising the human body wearing the target garment based on the target garment deformation image, the second human body template image, and the garment deformation template image.

2. The image processing method of claim 1, further comprising:
    generating, by the at least one processor, a human body keypoint image representing keypoints of a human body pose by performing a keypoint identification on the first image,
    wherein generating the garment deformation template image and the first human body template image based on the first semantic segmentation image of the first image and the target garment image comprises:
        generating the garment deformation template image and the first human body template image based on the first semantic segmentation image, the human body keypoint image, and the target garment image.

3. The image processing method of claim 2, wherein generating the garment deformation template image and the first human body template image based on the first semantic segmentation image, the human body keypoint image, and the target garment image comprises:
    obtaining the first human body template image and the garment deformation template image by processing the first semantic segmentation image, the human body keypoint image and the target garment image with a semantic generative network.

4. The image processing method of claim 3, wherein the semantic generative network comprises a first generative adversarial network and a second generative adversarial network,
    wherein obtaining the first human body template image and the garment deformation template image by processing the first semantic segmentation image, the human body keypoint image and the target garment image with the semantic generative network comprises:
        obtaining the first human body template image by processing the first semantic segmentation image, the human body keypoint image, and the target garment image with the first generative adversarial network; and
        obtaining the garment deformation template image by processing the first human body template image, the human body keypoint image, and the target garment image with the second generative adversarial network.

5. The image processing method of claim 1, further comprising generating the first semantic segmentation image by
    generating a raw semantic segmentation image by performing semantic segmentation on the first image, wherein the raw semantic segmentation image comprises semantic segmentation regions respectively corresponding to different parts of the human body in the first image, and
    generating the first semantic segmentation image by fusing at least two of the semantic segmentation regions belonging to a same limb and having different semantic segmentation results in the raw semantic segmentation image.

6. The image processing method of claim 1, wherein generating the target garment deformation image by performing deformation on the target garment image based on the garment deformation template image comprises:
    obtaining the target garment deformation image by performing deformation on the target garment image with a garment deformation network based on the garment deformation template image.

7. The image processing method of claim 6, further comprising training the garment deformation network by:
    obtaining a sample garment deformation template image and a sample garment image;
    learning deformation relationship information between the sample garment image and the sample garment deformation template image with a neural network;
    obtaining a predicted deformation image of the sample garment image by performing thin plate spline interpolation transformation on the sample garment image based on the deformation relationship information;
    obtaining a model loss based on a second-order differential constraint of the thin plate spline interpolation transformation, the predicted deformation image, and the sample garment image;

training the neural network based on the model loss; and taking the trained neural network as the garment deformation network.

8. The image processing method of claim 1, wherein different parts of the human body in the first image are marked in the first semantic segmentation image, and wherein the second semantic segmentation image comprises:
- a first semantic segmentation sub-image in which a human body part covered by an original garment in the first image is marked, and
- a second semantic segmentation sub-image in which a human body part not covered by the original garment in the first image is marked.

9. The image processing method of claim 8, wherein obtaining the second human body template image by adjusting the first human body template image based on the second semantic segmentation image of the human body in the first image and the garment deformation template image comprises:

obtaining a first intermediate template image by performing element-by-element multiplication on the first semantic segmentation sub-image and the first human body template image, wherein the first intermediate template image comprises at least one of a first sub-template image in which a human body region covered by the original garment but not covered by the target garment is marked, or a second sub-template image in which a human body region covered by the target garment but not covered by the original garment is marked;

generating a second intermediate template image by performing element-by-element addition on the first intermediate template image and the second semantic segmentation sub-image; and obtaining the second human body template image by performing element-by-element multiplication on the second intermediate template image and a complementary set of the garment deformation template image.

10. The image processing method of claim 1, wherein transforming the first image into the second image comprising the human body wearing the target garment based on the target garment deformation image, the second human body template image, and the garment deformation template image comprises:

generating a refined image of the target garment deformation image by performing refining by inputting the target garment deformation image into a refining network;

generating a refined target garment deformation image based on the refined image and the target garment deformation image; and transforming the first image into the second image based on the refined target garment deformation image, the second human body template image, and the garment deformation template image.

11. The image processing method of claim 10, wherein transforming the first image into the second image based on the refined target garment deformation image, the second human body template image, and the garment deformation template image comprises:

generating, based on the first image, the second semantic segmentation image of the first image, and the garment deformation template image, a human body image in which regions covered by the target garment and the original garment are removed; and obtaining the second image by fusing the refined target garment deformation image, the second human body template image, the garment deformation template image, and the human body image.

12. The image processing method of claim 11, wherein obtaining the second image by fusing the refined target garment deformation image, the second human body template image, the garment deformation template image, and the human body image comprises:

concatenating the refined target garment deformation image, the second human body template image, the garment deformation template image, and the human body image, and then inputting into a pre-trained fusion network to obtain the second image.

13. The image processing method of claim 12, further comprising training the fusion network by:

obtaining a sample garment deformation image, a sample human body template image, a sample garment deformation template image, and a sample human body image in which regions covered by a sample garment and an original garment are removed;

generating a covered sample human body image by performing random covering on a limb associated with a human body region covered by the original garment in the sample human body image;

obtaining a predicted image by inputting the sample garment deformation image, the sample human body template image, the sample garment deformation template image, and the covered sample human body image into a third generative adversarial network;

training the third generative adversarial network based on the predicted image and a real image corresponding to the predicted image; and taking the trained third generative adversarial network as the fusion network.

14. A computer device, comprising:

a bus;

at least one processor; and one or more memories coupled to the at least one processor and storing programming instructions for execution by the at least one processor to perform operations comprising:

generating a garment deformation template image and a first human body template image based on a first semantic segmentation image of a human body in a first image and a target garment image, wherein, in the first human body template image, a human body region not covered by a target garment is marked;

generating a target garment deformation image by performing deformation on the target garment image based on the garment deformation template image;

obtaining a second human body template image by adjusting the first human body template image based on a second semantic segmentation image of the human body in the first image and the garment deformation template image; and transforming the first image into a second image comprising the human body wearing the target garment based on the target garment deformation image, the second human body template image, and the garment deformation template image.

15. The computer device of claim 14, wherein the operations further comprise:

generating a human body keypoint image representing keypoints of a human body pose by performing keypoint identification on the first image; and wherein generating the garment deformation template image and the first human body template image based on the first semantic segmentation image of the first image and the target garment image comprises:

generating the garment deformation template image and the first human body template image based on the first semantic segmentation image, the human body keypoint image and the target garment image.

16. The computer device of claim 15, wherein generating the garment deformation template image and the first human body template image based on the first semantic segmentation image, the human body keypoint image and the target garment image comprises:

obtaining the first human body template image and the garment deformation template image by processing the first semantic segmentation image, the human body keypoint image and the target garment image with a semantic generative network.

17. The computer device of claim 16, wherein the semantic generative network comprises: a first generative adversarial network and a second generative adversarial network, and wherein obtaining the first human body template image and the garment deformation template image by processing the first semantic segmentation image, the human body keypoint image and the target garment image with the semantic generative network comprises:

obtaining the first human body template image by processing the first semantic segmentation image, the human body keypoint image and the target garment image with the first generative adversarial network; and obtaining the garment deformation template image by processing the first human body template image, the human body keypoint image and the target garment image with the second generative adversarial network.

18. The computer device of claim 14, wherein the operations further comprise generating the first semantic segmentation image by:

generating a raw semantic segmentation image by performing semantic segmentation on the first image, wherein the raw semantic segmentation image comprises semantic segmentation regions respectively corresponding to different parts of the human body in the first image; and generating the first semantic segmentation image by fusing at least two of the semantic segmentation regions belonging to a same limb and having different semantic segmentation results in the raw semantic segmentation image.

19. The computer device of claim 14, wherein generating the target garment deformation image by performing deformation on the target garment image based on the garment deformation template image comprises:

obtaining the target garment deformation image by performing deformation on the target garment image with a garment deformation network based on the garment deformation template image.

20. A non-transitory computer readable storage medium coupled to the at least one processor having machine-executable instructions stored thereon that, when executed by the at least one processor, cause the at least one processor to perform operations comprising:

generating a garment deformation template image and a first human body template image based on a first semantic segmentation image of a human body in a first image and a target garment image, wherein, in the first human body template image, a human body region not covered by a target garment is marked;

generating a target garment deformation image by performing deformation on the target garment image based on the garment deformation template image;

obtaining a second human body template image by adjusting the first human body template image based on a second semantic segmentation image of the human body in the first image and the garment deformation template image; and transforming the first image into a second image comprising the human body wearing the target garment based on the target garment deformation image, the second human body template image, and the garment deformation template image.

* * * * *